US008688827B2

(12) United States Patent
Gonzalez-Banos et al.

(10) Patent No.: US 8,688,827 B2
(45) Date of Patent: Apr. 1, 2014

(54) OVERLAY NETWORK

(75) Inventors: Hector H. Gonzalez-Banos, Mountain View, CA (US); Robert Martin Wolff, San Jose, CA (US); Manjesh Malavalli, Sunnyvale, CA (US)

(73) Assignee: XVD Technology Holdings Limited, Shannon Co. Claire (IE)

( * ) Notice: Subject to any disclaimer, the term of this patent is extended or adjusted under 35 U.S.C. 154(b) by 73 days.

(21) Appl. No.: 13/025,128

(22) Filed: Feb. 10, 2011

(65) Prior Publication Data

US 2012/0209984 A1 Aug. 16, 2012

(51) Int. Cl.
*G06F 15/173* (2006.01)
*H04L 12/24* (2006.01)

(52) U.S. Cl.
CPC .................................. *H04L 41/145* (2013.01)
USPC ......................................................... 709/224

(58) Field of Classification Search
CPC ..................................................... H04L 41/145
USPC .................................. 709/217, 220, 223–226
See application file for complete search history.

(56) References Cited

U.S. PATENT DOCUMENTS

| | | | |
|---|---|---|---|
| 6,611,872 B1 | 8/2003 | McCanne | |
| 7,417,959 B2 | 8/2008 | Dorner et al. | |
| 7,610,332 B2 | 10/2009 | Barbir et al. | |
| 7,720,966 B2 | 5/2010 | Bodin et al. | |
| 7,751,383 B2 | 7/2010 | Chee et al. | |
| 7,773,609 B2 | 8/2010 | Kobara | |
| 7,779,138 B2 | 8/2010 | Oldenborgh et al. | |
| 7,801,857 B2 | 9/2010 | Betts et al. | |
| 7,814,154 B1 | 10/2010 | Kandekar et al. | |
| 7,822,801 B2* | 10/2010 | Zhao et al. | 709/201 |
| 7,835,285 B2 | 11/2010 | Ayyagari et al. | |
| 7,839,798 B2 | 11/2010 | Tang et al. | |
| 7,839,803 B1* | 11/2010 | Snelgrove et al. | 370/260 |
| 2006/0015773 A1* | 1/2006 | Singh et al. | 714/13 |
| 2006/0259542 A1* | 11/2006 | Wu et al. | 709/202 |
| 2008/0072264 A1* | 3/2008 | Crayford | 725/86 |

(Continued)

FOREIGN PATENT DOCUMENTS

WO 2008115221 A2 9/2008

OTHER PUBLICATIONS

"Andreica", Techniques for Optimization of Communication Flows in Distributed Systems, Jan. 23, 2010.*

(Continued)

*Primary Examiner* — Michael Won
*Assistant Examiner* — Nicholas Celani
(74) *Attorney, Agent, or Firm* — Mollborn Patents, Inc.; Fredrik Mollborn

(57) ABSTRACT

Methods, apparatus and systems, including computer program products, implementing and using techniques for providing a scalable and elastic two-level overlay computer network. A host network is provided. The host network includes a system of interconnected computers and can to support one or more transport layer protocols. A first overlay network is generated on top of the host network. The first overlay network includes one or more first-level nodal entities. At least some of the first-level nodal entities operate as factories for generating second-level nodal entities in a second overlay network. In response to receiving an instruction, one or more factories dynamically generate the second overlay network. The second overlay network includes several networked second-level nodal entities that can support data processing and data communication between the second-level nodal entities.

33 Claims, 1 Drawing Sheet

(56) References Cited

U.S. PATENT DOCUMENTS

| | | | |
|---|---|---|---|
| 2008/0177833 A1* | 7/2008 | Gu et al. | 709/204 |
| 2009/0100096 A1* | 4/2009 | Erlichson et al. | 707/104.1 |
| 2010/0027442 A1* | 2/2010 | Chockler et al. | 370/254 |
| 2010/0161817 A1* | 6/2010 | Xiao et al. | 709/229 |
| 2012/0117229 A1* | 5/2012 | Van Biljon et al. | 709/224 |
| 2012/0173664 A1* | 7/2012 | Kammerer et al. | 709/217 |
| 2012/0179672 A1* | 7/2012 | Van Wie et al. | 707/723 |
| 2012/0191856 A1* | 7/2012 | Chen et al. | 709/226 |

OTHER PUBLICATIONS

Anonymous: "Data Distribution Service for Real-time Systems", Jan. 1, 2007, pp. 1-280, XP007920523, Retrieved from the Internet: URL:http://www.omg.org/spec/DDS/1.2/PDF.

International Search Report and the Written Opinion of the International Searching Authority. International Application No. PCT/EP2012/051870. Date of the actual completion of the international search May 7, 2012.

Invitation to Pay Additional Fees and, Where Applicable, Protest Fee and Annex to Form PCT/ISA/206 Communication Relating to the Results of the Partial International Search From the International Searching Authority. International Application No. PCT/EP2012/051874. Date of mailing May 24, 2012.

Paroo-Castellote G: "OMG data-distribution service: architectural overview", Multimedia Signal Processing, 2002 IEEE Workshop on Dec. 9-11, 2002, Piscataway, NJ, USA,IEEE, May 19, 2003, pp. 200-206, XP010642373, ISBN: 978-0-7803-7713-4.

Schmidt D C et al: "Addressing the challenges of mission-critical information management in next-generation net-centric pub/sub systems with Open Splice DDS", Parallel and Distributed Processing, 2008. IPDPS 2008. IEEE International Symposium on, IEEE, Piscataway, NJ, USA, Apr. 14, 2008, pp. 1-8, XP031268539, ISBN: 978-1-4244-1693-6.

PCT International Preliminary Report on Patentability and Written Opinion of the International Searching Authority. International application No. PCT/EP2012/051870. Date of issuance of this report: Aug. 13, 2013.

PCT International Preliminary Report on Patentability and Written Opinion of the International Searching Authority. International application No. PCT/EP2012/051874. Date of issuance of this report: Aug. 13, 2013.

* cited by examiner

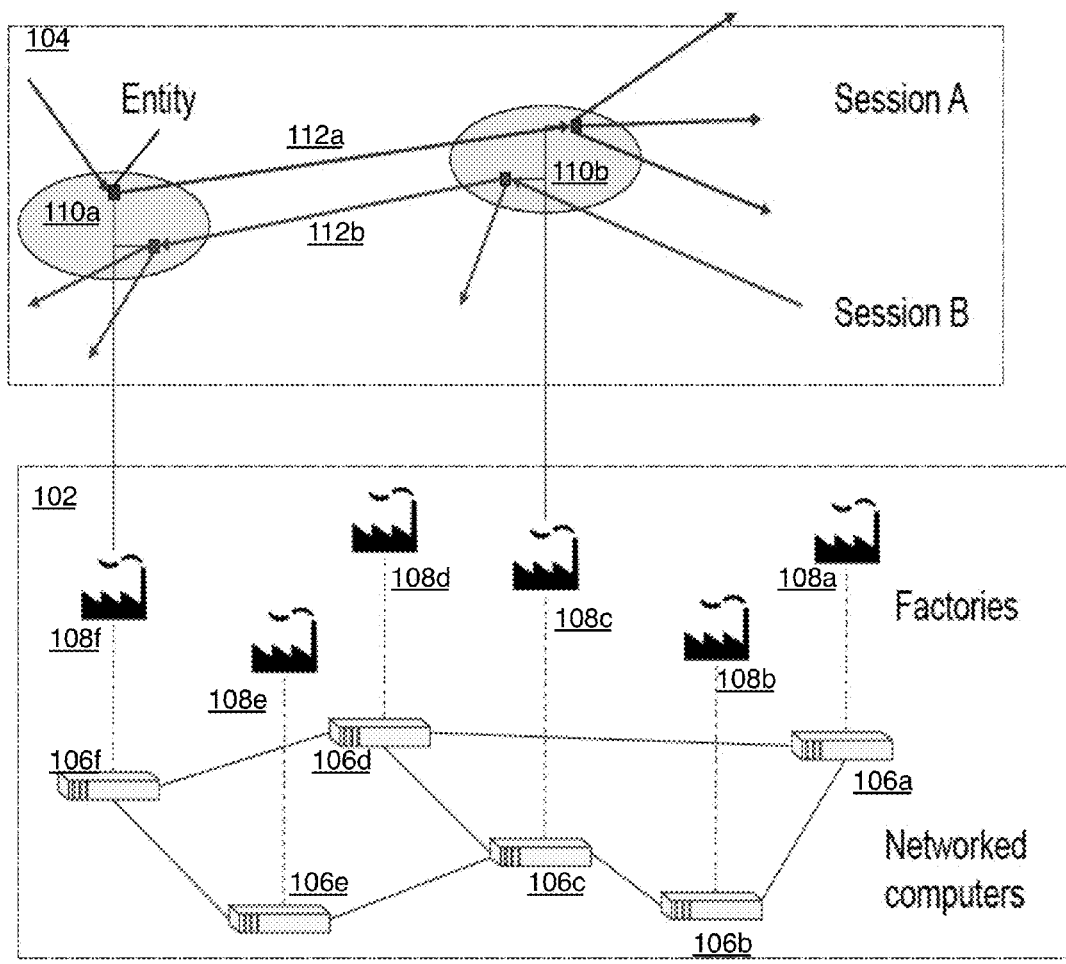

OVERLAY NETWORK

BACKGROUND

The present invention relates to multimedia and telecommunications technology, and more specifically, to communications networks.

In recent years, communications networks have evolved from being static to becoming more elastic and reconfigurable. Generally speaking, elastic reconfigurable networks have the ability to change in response to a changing demand for bandwidth, processing, traffic congestion, or latency, and as such they provide mechanisms for better performance at lower cost. For example, multiplayer gaming systems have varying demands as players enter and exit the game, or as the play progresses. A network that adaptively modifies the available computation and networking resources allows better use and better leverage of capital equipment. Similarly a peer-to-peer network can dynamically add hubs to centralize and optimize network intensive communication and free those resources for others after the demand diminishes.

As new technologies evolve, communications networks are being increasingly used for applications such as multi-party video conferencing. Conventional multi-party video conferencing today primarily relies on Multi-point Control Units (MCUs). The role of an MCU is to act as a centralized bridge interconnecting video calls from multiple sources. Ad-hoc multi-point calls (for example, using peer-to-peer technology) can sometimes circumvent the use of the MCU. However, this comes at the expense of interoperability loss, additional endpoint complexity, and increased use of network bandwidth, since every participant in a multi-party conference must transmit their video and audio stream to every remote conference participant.

Hardware-based MCUs conventionally contain specialized hardware for performing various types of functionality, such as encoding, decoding and transcoding video and audio streams between different formats. In some cases, the hardware-based MCUs can additionally perform various types of value added functionality, such as recording video and audio data for several video codecs. The hardware-based solution provides high performance and high fidelity of the video and audio signals. However, it is difficult to scale hardware-based MCUs since cross-connecting units tends to be both complex and costly.

Recently, software-based MCU solutions have emerged, which aim to reduce the relatively high cost of a hardware-based solution. However, this is accomplished at the expense of loss of fidelity or performance and increased latency. The software-based MCUs retain the scalability limitations of the hardware-based MCUs, but they have a somewhat lower cost of ownership, and may also offer better deployment flexibility.

SUMMARY

According to one aspect of the present invention, methods, apparatus, and systems, including computer program products, are described for providing a scalable and elastic two-level overlay computer network. A host network is provided. The host network includes a system of interconnected computers and can support one or more transport layer protocols. A first overlay network is generated on top of the host network. The first overlay network includes one or more first-level nodal entities. At least some of the first-level nodal entities operate as factories for generating second-level nodal entities in a second overlay network. In response to receiving an instruction, one or more factories dynamically generate the second overlay network. The second overlay network includes several networked second-level nodal entities that can support data processing and data communication between the second-level nodal entities.

Various implementations can include one or more of the following features. A second-level nodal entity can function as a proxy server for another second-level nodal entity. The first-level nodal entities can include one or more processes running in one or more networked virtual or physical servers. The first-level nodal entities can be processes hosted in a cloud-computing environment. A factory can destroy a second-level nodal entity, or a second-level nodal entity can destroy itself. The one or more factories can generate, delete or migrate second-level nodal entities based on link congestion, user behavior, business targets, communication costs or communication failure. Each factory can manage its generated second-level nodal entities and monitor computational resources consumed on its host and by the hosts for the second-level nodal entities generated by the factory. The performance of the factories can be monitored and if a malfunctioning factory is detected, the tasks of the malfunctioning factory can be assumed by one or more of the other factories.

Data originating at a second-level nodal entity can be distributed to a designated set of second-level nodal entities in the second overlay network, wherein the designated set of second-level nodal entities is disjoint from other second-level entities in the second overlay network. Entities in the designated set of second-level nodal entities can be connected to form a graph, so that the second-level nodal entities in the designated set of second-level nodal entities constitute vertices of the graph and the connections between the second-level nodal entities constitute links of the graph. Data can be distributed within the designated set of second-level nodal entities from a source second-level nodal entity to a destination second-level nodal entity along an acyclical path. The data distribution from the source second-level nodal entity to the destination second-level nodal entity along the acyclical path can be ensured by using a rooted tree having the source second-level nodal entity as a root.

The second overlay network can implement real-time publish-subscribe network functionality. The real-time data stream can be published in several versions by one or more second-level nodal entities among the second-level nodal entities. One or more second-level nodal entities can subscribe to real-time data streams published by one or more second-level nodal entities. A second-level nodal entity can aggregate two or more real-time data streams into a single real-time data stream and retransmit the single real-time data stream. A second-level nodal entity can transform a real-time data stream from a first format into a second format. A second-level nodal entity can record a real-time data stream. A second-level nodal entity can play back a data stream.

The host network can support a Transmission Control Protocol or a User Data Protocol. The data communication among the second-level nodal entities can include video, audio, chat, financial market data, radar data, telemetry, telecommands, teleprescence data, haptics measurements, or telemedicine data.

Several redundant second-level nodal entities that publish the same data stream can be created. An independent second overlay network that includes a disjoint set of second-level nodal entities can be generated when a new session is established. Real-time data-centric publish subscribe mechanisms can be used to manage the one or more factories. The second overlay network can be a content delivery network, a publish-subscribe network, a data-centric publish-subscribe network, a real-time transport protocol network, a sensor network, a peer-to-peer network, a user datagram protocol network, or a content addressable storage network. The second-level nodal entities can be nodes or supernodes of a peer-to-peer network.

Various implementations can include one or more of the following advantages. Media streams can be interconnected and bridged in a fully decentralized manner, relying on existing IT infrastructure, and offer the same benefits as a centralized MCU. This is true not only for video communication, but also for other real-time and/or high-throughput applications. A highly scalable, elastic, fault tolerant, variable cost network is provided that allows the connection and transformation of variable and high bandwidth streams according to business, quality or other goals.

The details of one or more implementations of the invention are set forth in the accompanying drawings and the description below. Other features and advantages of the invention will be apparent from the description and drawings, and from the claims.

DESCRIPTION OF DRAWINGS

FIG. 1 is a schematic diagram of a two layer overlay network on top of a host network, in accordance with one implementation.

Like reference symbols in the various drawings indicate like elements.

DETAILED DESCRIPTION

Overview

In a first general aspect, the various implementations of the invention are directed to a two-level overlay network on top of a host network, such as a network supporting, for example, the Transmission Control Protocol (TCP) and the User Datagram Protocol (UDP). The first overlay network can be described as a persistent, dynamically scaled and highly available network. The second overlay network is dynamically created by the first overlay network. The first overlay network requires reasonable, but not stringent response times and relatively low bandwidth to support signaling. The second overlay, is configured dynamically by signals from the first overlay, and requires a real-time high bandwidth infrastructure for video and other high bandwidth real time communications.

In another general aspect, the second overlay network further contains second-level nodal entities (referred to henceforth as "entities") that are instantiated, destroyed and supervised by the first overlay network. In some implementations, these entities serve as relays or proxies either for another entity within the second overlay network or for an external source outside the second overlay network. These entities publish their stream of data, potentially in several versions. These versions can vary based on factors such as the quality of the stream, the encoding provided, or another transformation of the incoming data stream. In various different implementations, an entity can stream data to another entity in a cascading manner or stream the data directly to an external destination in an application endpoint. Entities can subscribe to a topic and receive a specific level of service that the entity requests.

In yet another general aspect, the second overlay network can connect from a single parent and in a unidirectional manner to other entities in a "fan out configuration" until the stream arrives at one or several destinations, either external or other entities. An exception to this general structure is an aggregator entity, which can combine two or more streams into a single stream and transmit this combined stream to a destination.

In some implementations, there may not be any further connections from the parent to the several destinations, but the parent can be the destination itself. One example of such a scenario is a situation in which a stream is recorded by an entity, without being forwarded to any further external or other entities.

The various implementations that will be described in further detail herein allow media streams to interconnect and bridge in a fully decentralized manner, relying on existing Information Technology (IT) infrastructure, while offering the same benefits that can be obtained with a conventional, centralized MCU. As will be described in further detail below, the various implementations can be used in several contexts, such as video communication or other real-time and/or high-throughput applications.

As will be appreciated by one skilled in the art, aspects of the present invention may be implemented as a system, method or computer program product. Accordingly, aspects of the present invention may take the form of an entirely hardware implementation, an entirely software implementation (including firmware, resident software, micro-code, etc.) or an implementation combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages, or declarative languages and domain-specific languages such as the Lua programming language. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to implementations of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Exemplary Implementation of the Two-Layer Network

An exemplary implementation of the two-layer network will now be described with reference to FIG. 1, which shows a schematic diagram of a two layer overlay network (100) on top of a host network, such as a TCP/UDP network, in accordance with one implementation. It should be noted that for reasons of simplicity, only a few components of the network have been illustrated in FIG. 1, whereas in a real life scenario, there may be tens or hundreds of components. In the implementation illustrated in FIG. 1, the two-layer overlay network (100) is divided into a first layer (102) and a second layer (104). The first layer (102) includes one or more servers (106a-106f). The servers (106a-106f) can be either physical machines or software implementations of machines (i.e., a virtual machines), or a combination thereof. The servers (106a-106f) are connected by means of a network, illustrated in FIG. 1 by interconnecting lines between the servers (106a-106f), so that they can communicate with each other as needed. The servers (106a-106f) can be hosted either on data centers, co-location centers, computer facilities, server rooms, or in a so-called "cloud computing" environment.

Each server (106a-106f) can support one or more dynamically instantiated, maintained and destroyed factories (108a-108f). In the implementation shown in FIG. 1, a factory is a computer program that ordinarily runs as a background process in the hosting server. The factories (108a-108f) can, as a result of receiving an appropriate instruction, create or destroy one or more dynamically instantiated entities (110a-110b) in the second layer (104). Factories receive their instructions from dispatch controllers, which also act as nodes in the first overlay network. Dispatch controllers are programmable devices that can execute scripts controlling one or more factories. There can be several dispatch controllers acting in concert to enhance scalability and elasticity. In various implementations, the entities (110a-110b) can forward and potentially modify streams of information to designated entities (110a-110b) in a network structure, illustrated by the two networks (112a-112b) in the second layer (104), as will be described in further detail below.

In one implementation, a server, such as server 106f, creates a factory (108f). The factory (108f) gets paired with a dispatch controller and waits for further instructions. A dispatch controller communicates with its factories under a master-slave arrangement with the dispatch controller as master. As the controller executes a script, it may direct a factory to create, delete or migrate entities.

Upon receipt of the instruction, the factory (108f) creates a new entity (110a). In one implementation, the factory spawns entity managers to handle groups of entities. These entity managers run either as stand-alone programs or threads within a factory. Entities are spawned by the entity managers and run as threads. A factory communicates with the entity managers using a master-slave arrangement with the factory as master. A factory can monitor the computational resources used by itself, by the entity managers, and by other programs sharing the same server. Entities communicate network conditions to the factory through the entity managers using event-based messaging.

In some implementations, a second-level nodal entity can be transferred to a new hosting factory during runtime. This is also referred to as migration. Typically, migration occurs in response to factors such as network quality, latency and congestion, computational load, or detection of an imminent system failure. The operation also applies to an entity manager along with all its entities. Migration allows the end-user experience to remain nearly uninterrupted despite system-level changes In some implementations, the factories (108a-108f) can also create additional redundant entities, which together form a network of entities that all serve the same data originating from a designated application endpoint. Having this redundancy can provide many benefits. For example, the latency over long distance network connections, such as trans-pacific communications, can be reduced, messages can be transformed into different quality levels, the load on the network can be balanced, transcoding of streaming data from one encoding to another can be done.

In one implementation, the factories (108a-108f) can form multiple independent networks in the second layer (104). Thus, the second layer (104) can also be described as being composed of several disjoint networks (112a-112b), which each includes several networked entities (110a-110b). In yet another implementation, an entity manager only runs entities instantiated for the same network in the second layer (104).

In one implementation, the factories (108a-108f) use a real time data-centric publish subscribe or similar system to provide highly efficient and inexpensive support for messaging, publish, subscribe, topic creation, topic destruction, topic modification, and other data driven support. This data-centric communications is used to link a dispatch controller with the factories, a factory with the entity managers, and an entity manager with the entities.

In one implementation, the second layer (400) is used for video communications, which often require bandwidths above approximately 300 kbps and latencies lower than approximately 300 ms. The entities (110a-110b) created by the factories (108a-108f) require these high-bandwidth and low-latency connections, and in certain applications some entities (108a-108f) might further require adequate computing power for video transcoding, video analytics, recording, and video scaling. The factories (108a-108f), in comparison, typically require far lower computing and networking resources for creating and maintaining the first layer (102) of the overlay network (100). Consequently, the entities (110a-110b) are instantiated on demand, and the factories (108a-108f) have control over how many entities (110a-110b) are created and where they are created, depending among other things on factors such as network congestion, availability of computing resources, geographical locations of endpoint participants, and business considerations. The duplication of additional factories (108a-108f) and subsequent on-demand creation of entities (110a-110b) by the factories (108a-108f) provides a highly scalable, elastic, fault tolerant, variable cost network that allows the connection and transformation of variable and high bandwidth streams according to business, quality or other goals.

In one implementation each entity (110a-110b) receives data streams from a single parent only. The parent can be an application endpoint that initiated the need for an entity (110a-110b) or can be an entity (110a-110b) in a cascade of other entities (110a-110b) that eventually terminates at one or several final destinations. Two-way communication can be achieved in some implementations by creating a similar, but disjoint network from the receiving application endpoint with a path to the originating application endpoint.

The entities (110a-110b) can be the vertices of a graph. Given a set N of nodal entities, the connections in the graph can be represented as a set L of links or edges, where a link or edge is a 2-element subset of N specifying if a connection between a pair of nodes exists. A link can be unidirectional, which states that communication travels along said link in only one direction. Conversely, a bi-directional link allows communication to travel in both directions. The entities (110a-110b) implement a directed graph when all the links in the set L are unidirectional.

A desirable attribute in a communication network is to have messages originating from a source follow an acyclic path in its way to a destination. That is, the path must not contain cycles. In one implementation, the entities (110a-110b) form a directed graph, where forward and reverse messages between two application endpoints follow different acyclic paths. In yet another implementation, acyclic directed paths are guaranteed by construction. The entities (110a-110b) are arranged in disjoint and independent graphs, and each graph is a unidirectional and simple graph describing a rooted tree with an originating source as root. It would be obvious for someone skilled in the art that this approach greatly simplifies the routing of messages from an originating source to any destination in the tree.

In one implementation the entities (110a-110b) can adapt their behavior, for example, based on link congestion, application requests, communication costs, communication failure, bandwidth availability, etc. The adaptation can occur at various levels, such as at the level of an entity, path or topology. At the level of entity, a node can throttle both its demand for incoming data as well as its supply for outgoing data, regulating its behavior as a publisher and/or subscriber of data. At the path level, entities may route messages along different paths if redundant pathways exist. At the topology level, factories can create, delete or move entities in order to change the overall characteristics of the network.

As was described above, in one implementation, several entities (110a-110b) can be connected into a network (112a-112b). Redundant entities (110a-110b) assure reliability of the stream and are managed by the factories (108a-108f) and dispatch controllers. The putative redundant entities (110a-110b) can also divide the stream for load balancing, or cost optimization and deliver the different streams either to a single final entity (110a-110b) for unification, or the final end point may sort out the streams as part of the decoding process.

Applications

The various implementations of the two-layer network (100) described above can be used in a wide range of applications, some of which will be described below. It should be noted that this is by no means an exhaustive list and that the two-layer network (100) can be used in many other situations than those described herein.

In one application the two-layer network (100) enables a scalable communication exchange for widely dispersed multi-channel media streams, ideal for crowd generated content and multi-way, real time interaction delivered either from a proprietary network of computers or as a cloud service.

In one application the two-layer network (100) enables distributed learning with real time interaction of the remote students and distributed break out sessions of distributed groups of students. For example, first, there can be a massive "fan out" from the teacher to the students. Then the students can form groups with multi-way communication between the students in each group, which can be further supervised by the teacher, either simultaneously, or successively with changing the group of interest by the teacher. Then the two-layer network (100) can reconfigure back to a configuration in which the teacher broadcasts to her audience.

In one application the two-layer network (100) enables real time video communication of actual or virtual video game play between different players, or the viewing of such game play by a third party for entertainment or pedagogical purposes.

In one application the two-layer network (100) enables interoperability between otherwise incompatible video chat services. Some examples of such chat services include Google Talk, Yahoo Messenger, Polycomm, or Cisco video conferencing. Other types of transformations are also possible. For example, in addition to the transcoding that was mentioned above, various implementations may include transformations that cause, for example, a video stream to be transformed to create cartoons, or avatars representing people. Other transformations can include speech-to-text, or text-to-speech. Many further possibilities can be envisioned by those of ordinary skill in the art.

In one application the two-layer network's entities (110a-110b) can leverage scalable encodings such as that described in the Annex G extension of the H.264/MPEG-4 AVC video compression standard to deliver variable bandwidth streams, depending on the receiving application endpoint. The level of bandwidth can be determined explicitly through configuration, or be determined by an entity (110a-110b) based on its algorithms.

In one application the two-layer network (100) can enable real time bidirectional content delivery network type functionality by creating entities (110a-110b) that are located geographically close to a demanding application endpoint and caching content on those entities (110a-110b).

In one application the two-layer network (100) enables content addressable storage to enable the caching of exactly one copy that other application endpoints may access, for example, for movie editing or similar types of operations.

CONCLUDING COMMENTS

The terminology used herein is for the purpose of describing particular implementations only and is not intended to be limiting of the invention. As used herein, the singular forms "a", an and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. For example, while data streams such as video, audio, chat, etc. have been discussed above, the same techniques can apply to other data streams as well, such as financial market data, radar data, telemetry, telecommands, telepresence data, haptics measurements, or telemedicine data relating to monitoring of a patient in a hospital, for example.

The implementations described herein were chosen and described in order to best explain the principles of the invention and the practical application, and to enable others of ordinary skill in the art to understand the invention for various implementations with various modifications as are suited to the particular use contemplated.

The invention claimed is:

1. A method, implemented at least in part by a computing device, for providing a scalable and elastic two-level overlay computer network, comprising:
    providing a host network, wherein the host network includes a system of interconnected computers and is operable to support one or more transport layer protocols;
    generating a first overlay network, wherein:
        the first overlay network includes one or more first-level nodal entities and one or more dispatch controllers,
        the first-level nodal entities are background programs running within the operating system on a physical machine or on a virtual machine platform in the host network, and
        the first-level nodal entities are operable to generate second-level nodal entities in a second overlay network;
    in response to a first-level nodal entity receiving an instruction from a dispatch controller, generating, by one or more first-level nodal entities, the second overlay network, wherein:
        the second overlay network includes a plurality of networked second-level nodal entities forming a circuit network,
        the second-level nodal entities are dynamically spawned and run as threads by the first-level nodal entities,
        the second-level nodal entities are transferable between the first-level nodal entities, and
        the second overlay network is operable to support high-bandwidth data processing and data communication between the second-level nodal entities in the circuit network,
    distributing data originating at a second-level nodal entity to a designated set of second-level nodal entities in the second overlay network, wherein the designated set of second-level nodal entities is disjoint from other second-level entities in the second overlay network; and
    connecting entities in the designated set of second-level nodal entities to form a graph, wherein the second-level nodal entities in the designated set of second-level nodal entities constitute vertices of the graph and wherein connections between the second-level nodal entities constitute links of the graph.

2. The method of claim 1, wherein a second-level nodal entity is operable to function as a proxy server for another second-level nodal entity.

3. The method of claim 1, wherein the first-level nodal entities are programs hosted in a cloud-computing environment.

4. The method of claim 1, further comprising:
    destroying a second-level nodal entity either by a first-level nodal entity or by the second-level nodal entity itself.

5. The method of claim 1, wherein the one or more first-level nodal entities are further operable to perform one or more of: generating second-level nodal entities, deleting second-level nodal entities, and migrating second-level nodal entities, based on one or more of: link congestion, user behavior, business targets, communication costs and communication failure.

6. The method of claim 1, wherein each first-level nodal entity is further operable to manage its generated second-level nodal entities and to monitor computational resources consumed on its host and by the hosts for the second-level nodal entities generated by the first-level nodal entity.

7. The method of claim 1, further comprising:
    monitoring the performance of the first-level nodal entities; and
    in response to detecting a malfunctioning first-level nodal entity, assuming the tasks of the malfunctioning first-level nodal entity by one or more of the other first-level nodal entities.

8. The method of claim 1, further comprising:
    distributing data within the designated set of second-level nodal entities from a source second-level nodal entity to a destination second-level nodal entity along an acyclical path.

9. The method of claim 8, wherein the data distribution from the source second-level nodal entity to the destination second-level nodal entity along the acyclical path is ensured by using a rooted tree having the source second-level nodal entity as a root.

10. The method of claim 1, wherein the second overlay network implements real-time publish-subscribe network functionality.

11. The method of claim 10, further comprising:
publishing the real-time data stream in a plurality of versions by one or more second-level nodal entities among the plurality of second-level nodal entities.

12. The method of claim 10, further comprising:
subscribing by one or more second-level nodal entities to real-time data streams published by one or more second-level nodal entities among the plurality of second-level nodal entities.

13. The method of claim 10, further comprising:
aggregating by a second-level nodal entity two or more real-time data streams into a single real-time data stream; and
retransmitting the single real-time data stream.

14. The method of claim 10, further comprising:
transforming by a second-level nodal entity a real-time data stream from a first format into a second format.

15. The method of claim 10, further comprising:
recording by a second-level nodal entity a real-time data stream.

16. The method of claim 10, further comprising:
playing back, by a second-level nodal entity, a data stream.

17. The method of claim 1, wherein the host network is operable to support one or more of: a Transmission Control Protocol and a User Data Protocol.

18. The method of claim 1, wherein the data communication includes one or more of: video, audio, chat, financial market data, radar data, telemetry, telecommands, telepresence data, haptics measurements, and telemedicine data.

19. The method of claim 11, further comprising:
creating a plurality of redundant second-level nodal entities that publish the same data stream.

20. The method of claim 1, further comprising:
generating an independent second overlay network comprising a disjoint set of second-level nodal entities in response to establishing a new session.

21. The method of claim 1, wherein real-time data-centric publish subscribe mechanisms are used to manage the one or more first-level nodal entities.

22. The method of claim 1, wherein the second overlay network is one of:
a content delivery network, a publish-subscribe network, a data-centric publish-subscribe network, a real-time transport protocol network, a sensor network, a peer-to-peer network, a user datagram protocol network, and a content addressable storage network.

23. The method of claim 22, wherein the second-level nodal entities are nodes or supernodes of a peer-to-peer network.

24. A scalable and elastic two-level overlay computer network, comprising:
a host network, the host network including a system of interconnected computers and being operable to support one or more transport layer protocols;
a first overlay network including one or more first-level nodal entities and one or more dispatch controllers, wherein:
the first-level nodal entities are background programs running within the operating system on a physical machine or on a virtual machine platform in the host network, and
the first-level nodal entities are operable to generate second-level nodal entities in a second overlay network; and
a second overlay network, the second overlay network being generated by one or more first-level nodal entities in response to a first-level nodal entity receiving an instruction from a dispatch controller, wherein:
the second overlay network includes a plurality of networked second-level nodal entities forming a circuit network,
the second-level nodal entities are dynamically spawned and run as threads by the first-level nodal entities,
the second-level nodal entities are transferable between the first-level nodal entities,
the second overlay network is operable to support high-bandwidth data processing and data communication between the second-level nodal entities in the circuit network,
the second overlay network is operable to distribute data originating at a second-level nodal entity to a designated set of second-level nodal entities, wherein the designated set of second-level nodal entities is disjoint from other second-level entities in the second overlay network, and
the second overlay network is operable to connect entities in the designated set of second-level nodal entities to form a graph, wherein the second-level nodal entities in the designated set of second-level nodal entities constitute vertices of the graph and wherein connections between the second-level nodal entities constitute links of the graph.

25. The overlay network of claim 24, wherein a second-level nodal entity is operable to function as a proxy server for another second-level nodal entity.

26. The overlay network of claim 24, wherein the one or more first-level nodal entities are further operable to perform one or more of: generating second-level nodal entities, deleting second-level nodal entities, and migrating second-level nodal entities, based on one or more of: link congestion, user behavior, business targets, communication costs and communication failure.

27. The overlay network of claim 24, wherein each first-level nodal entity is further operable to perform one or more of:
managing its generated second-level nodal entities,
monitoring computational resources consumed on its host and by the hosts for the second-level nodal entities generated by the first-level nodal entity,
monitoring the performance of the first-level nodal entities, and
in response to detecting a malfunctioning first-level nodal entity, assuming the tasks of the malfunctioning first-level nodal entity by one or more of the other first-level nodal entities.

28. The overlay network of claim 24, wherein the designated set of second-level nodal entities is operable to distributing data within the designated set of second-level nodal entities from a source second-level nodal entity to a destination second-level nodal entity along an acyclical path.

29. The overlay network of claim 28, wherein the data distribution from the source second-level nodal entity to the destination second-level nodal entity along the acyclical path is ensured by using a rooted tree having the source second-level nodal entity as a root.

30. The overlay network of claim 24, wherein the second overlay network implements real-time publish-subscribe network functionality.

31. The overlay network of claim 24, wherein the data communication includes one or more of: video, audio, chat, financial market data, radar data, telemetry, telecommands, teleprescence data, haptics measurements, and telemedicine data.

32. The overlay network of claim 24, wherein the second overlay network is one of:
a content delivery network, a publish-subscribe network, a data-centric publish-subscribe network, a real-time transport protocol network, a sensor network, a peer-to-peer network, a user datagram protocol network, and a content addressable storage network.

33. The overlay network of claim 32, wherein the second-level nodal entities are nodes or supernodes of a peer-to-peer network.

* * * * *